US012562055B2

(12) United States Patent
Käfer

(10) Patent No.: US 12,562,055 B2
(45) Date of Patent: Feb. 24, 2026

(54) METHOD FOR CHECKING A PRE-DETERMINED SPEED LIMIT FOR VEHICLES ON A ROAD AND METHOD FOR SUPPORTING A DRIVER

(71) Applicant: MERCEDES-BENZ GROUP AG, Stuttgart (DE)

(72) Inventor: Eugen Käfer, Renningen (DE)

(73) Assignee: MERCEDES-BENZ GROUP AG, Stuttgart (DE)

( * ) Notice: Subject to any disclaimer, the term of this patent is extended or adjusted under 35 U.S.C. 154(b) by 188 days.

(21) Appl. No.: 18/292,396

(22) PCT Filed: Jun. 22, 2022

(86) PCT No.: PCT/EP2022/067015
§ 371 (c)(1),
(2) Date: Jan. 26, 2024

(87) PCT Pub. No.: WO2023/006303
PCT Pub. Date: Feb. 2, 2023

(65) Prior Publication Data
US 2025/0087086 A1 Mar. 13, 2025

(30) Foreign Application Priority Data
Jul. 27, 2021 (DE) ..................... 10 2021 003 870.3

(51) Int. Cl.
*G08G 1/052* (2006.01)
*G08G 1/0967* (2006.01)

(52) U.S. Cl.
CPC .......... *G08G 1/052* (2013.01); *G08G 1/0967* (2013.01)

(58) Field of Classification Search
None
See application file for complete search history.

(56) References Cited

U.S. PATENT DOCUMENTS 8,494,759 B2 7/2013 Hada
9,114,707 B2 8/2015 Shida
9,157,784 B2 * 10/2015 Trebbi .................. G01G 9/005
9,586,581 B2 3/2017 Strauss et al.
10,029,685 B1 * 7/2018 Hubbard ............ B60W 30/146
(Continued)

FOREIGN PATENT DOCUMENTS

CN 103098109 A 5/2013
CN 103477377 A 12/2013
(Continued)

OTHER PUBLICATIONS

Office Action dated Oct. 30, 2024 in related/corresponding CN Application No. 202280052699.
(Continued)

*Primary Examiner* — Peter D Nolan
*Assistant Examiner* — Demetra R Smith-Stewart
(74) *Attorney, Agent, or Firm* — PATENT PORTFOLIO BUILDERS PLLC

(57) ABSTRACT

A predetermined speed limit for vehicles on a road is checked by determining a situation-dependent suitable driving speed for driving on a route portion of the road, and if the suitable driving speed falls short of the predetermined speed limit, the predetermined speed limit is evaluated as unsuitable.

4 Claims, 2 Drawing Sheets

(56) References Cited

U.S. PATENT DOCUMENTS

Figure 1:
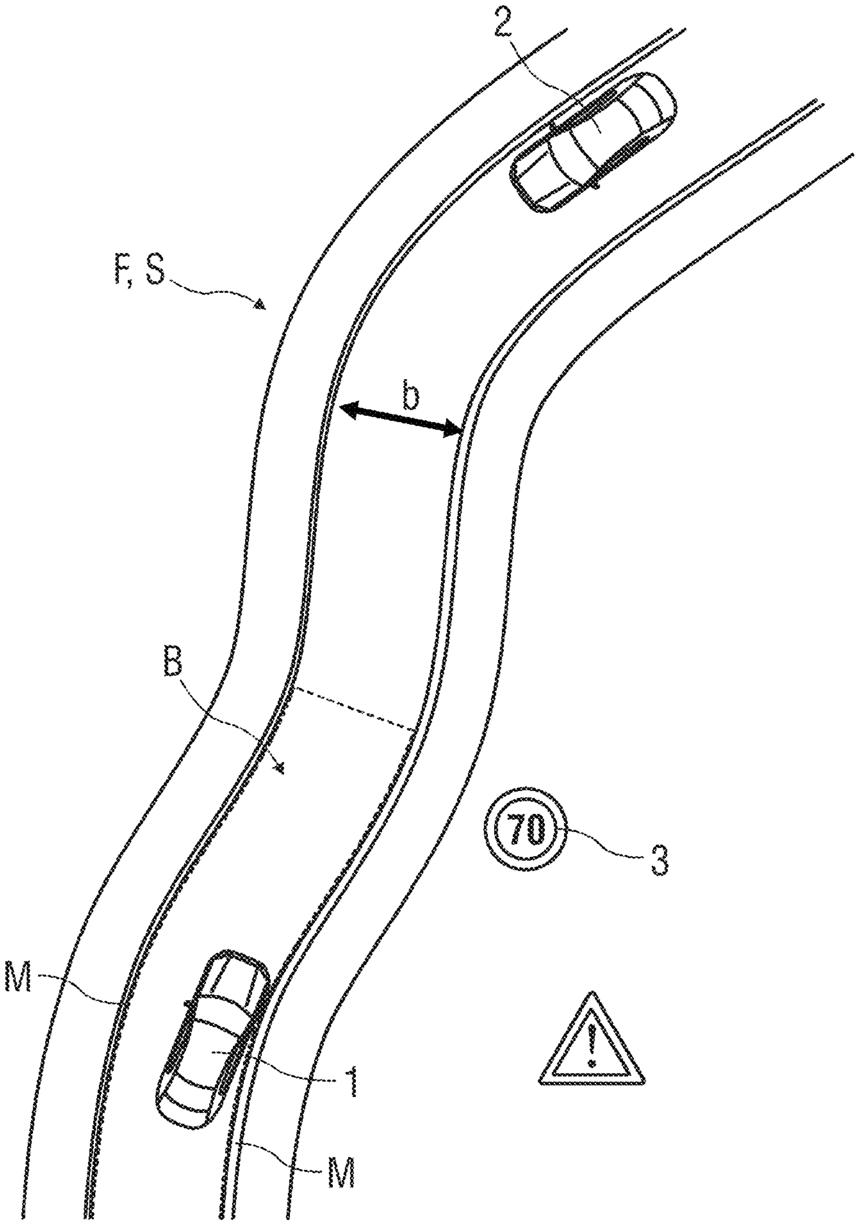

| | | | | |
|---|---|---|---|---|
| 10,720,080 | B1 * | 7/2020 | Fields | G07C 5/008 |
| 11,186,276 | B2 * | 11/2021 | Tao | G05D 1/0223 |
| 11,332,007 | B2 * | 5/2022 | McNew | B60K 31/00 |
| 11,721,238 | B1 * | 8/2023 | Fields | G09B 19/14<br>434/65 |
| 2008/0154629 | A1 * | 6/2008 | Breed | B60W 50/00<br>701/70 |
| 2012/0059574 | A1 | 3/2012 | Hada | |
| 2012/0197839 | A1 * | 8/2012 | Vervaet | G09B 29/003<br>707/E17.005 |
| 2014/0195068 | A1 | 7/2014 | Boss et al. | |
| 2016/0189540 | A1 | 6/2016 | Fowe et al. | |
| 2019/0025843 | A1 * | 1/2019 | Wilkinson | G01C 21/3407 |

FOREIGN PATENT DOCUMENTS

| | | | |
|---|---|---|---|
| CN | 105913671 | A | 8/2016 |
| CN | 106504164 | A | 3/2017 |
| CN | 112356834 | A | 2/2021 |
| DE | 102010061829 | A1 | 5/2012 |
| DE | 102015223176 | A1 | 5/2017 |
| DE | 102017006782 | A1 | 1/2018 |
| DE | 102019003963 | A1 | 1/2020 |
| DE | 102019203543 | A1 | 9/2020 |
| DE | 102019205331 | A1 | 10/2020 |
| DE | 102020003073 | B3 | 11/2021 |
| JP | 2008217121 | A | 9/2008 |
| JP | 2010282508 | A | 12/2010 |
| JP | 2012030665 | A | 2/2012 |
| JP | 2015075423 | A | 4/2015 |
| JP | 2015118668 | A | 6/2015 |
| JP | 2017094947 | A | 6/2017 |
| JP | 2018060456 | A | 4/2018 |
| JP | 2019070900 | A | 5/2019 |
| JP | 2019111882 | A | 7/2019 |
| KR | 102262810 | B1 | 6/2021 |

OTHER PUBLICATIONS

Office Action dated May 29, 2025 in related/corresponding KR Application No. 10-2024-7002387.

Office Action dated Jul. 2, 2024 in related/corresponding JP Application No. 2024-504924.

International Search Report and Written Opinion mailed Sep. 22, 2022 in related/corresponding International Application No. PCT/EP2022/067015.

Office Action created May 5, 2022 in related/corresponding DE Application No. 10 2021 003 870.3.

Office Action dated Nov. 5, 2024 in related/corresponding JP Application No. 2024-504924.

* cited by examiner

METHOD FOR CHECKING A PRE-DETERMINED SPEED LIMIT FOR VEHICLES ON A ROAD AND METHOD FOR SUPPORTING A DRIVER

BACKGROUND AND SUMMARY OF THE INVENTION

Exemplary embodiments of the invention relate to a method for checking a predetermined speed limit for vehicles on a road and to a method for supporting a driver of a vehicle.

DE 10 2020 003 073.4 describes a method and device for automated driving operation of a vehicle. The method provides that if there is a bend ahead of the vehicle, a visual range limitation, which is expected due to the bend, of at least one recording unit, directed in the direction of travel of the vehicle, of an environment sensor system is determined, and if it is determined that a visual range of the at least one recording unit falls short of a predetermined threshold value, a lane change of the vehicle to a lane on the outside of the bend is automatically carried out if a lane is present on the outside of the bend, where there is preferably no requirement to drive on the right.

DE 10 2015 223 176 A1 further discloses a driver assistance system for a vehicle having environment sensors, which record an environment of the vehicle by sensors, and having a data processing unit, which evaluates sensor data of the environment sensors to recognize obstacles in the vehicle environment. In addition, a method for determining concealed regions in the vehicle environment is disclosed. The method provides that the sensor data generated by the environment sensors is evaluated to recognize obstacles in the vehicle environment of the vehicle. In addition, depending on the recognized obstacles, concealed regions, which are covered by the recognized obstacles and limit a field of vision of optical environment sensors of the vehicle are calculated.

Exemplary embodiments of the invention are directed to a method for checking a predetermined speed limit for vehicles on a road and a method for supporting a driver of a vehicle.

According to the invention, a method for checking a predetermined speed limit for vehicles on a road provides that a situation-dependent suitable driving speed for driving on a route portion of the road is determined, and if the suitable driving speed falls short of the predetermined speed limit, the predetermined speed limit is evaluated as unsuitable.

By applying the method, a route portion can be determined of which the predetermined speed limit is unsuitable. If a vehicle is driving on this route portion at a driving speed corresponding to the predetermined speed limit, whereby there is a comparatively high potential for a critical situation, in particular a driving situation, to arise for the vehicle, and optionally further traffic participants in the immediate environment of the vehicle, then this route portion is determined by applying the method. In other words: By applying the method, a route portion with relatively high risk potential can be identified, because the predetermined speed limit corresponds to an excessive driving speed, and the route portion thus carries the risk of a relatively high accident potential, as long as a vehicle is driving on the route portion at a driving speed corresponding to the predetermined speed limit.

In a possible embodiment of the method for checking a predetermined speed limit, the predetermined speed limit is evaluated as unsuitable if the route portion of the road has traffic travelling in the opposite direction, in particular if a central lane marking is absent, and a width of the road falls short of a predetermined value. When driving on such a route portion, a potential for a critical situation arises, in particular if two vehicles are approaching each other and have to swerve to avoid each other, whereby a respective outside lane marking is driven over in order to avoid the respective approaching vehicle.

In a development of the method for checking a predetermined speed limit, to assess a traffic situation involving a plurality of vehicles on the route portion, a width of the road, in particular a road width, driving speeds of vehicles driving past each other and positions of the vehicles driving past each other are determined, for example also in relation to lane markings. Using this information, it is determined whether the predetermined speed limit for driving on the route portion is unsuitable, and thus whether there is a risk potential, in particular for vehicles approaching each other on the route portion.

In a further possible embodiment of the method for checking a predetermined speed limit, the determined width of the road, the driving speeds and the positions of the vehicles driving past each other are transferred as information to a vehicle-external computer unit coupled with the respective vehicle via data technology. In particular, this information is transmitted from vehicles of a vehicle fleet, for example of a vehicle producer, which drive on the road, to the vehicle-external computer unit. By means of the computer unit, the transmitted information is stored and continuously evaluated in order to check the speed limit predetermined for the road, i.e., for the route portion.

A further possible embodiment of the method for checking a predetermined speed limit additionally provides that by means of the computer unit, a statistical evaluation of the information transferred from a plurality of vehicles to the computer unit is carried out, and the route portion with an unsuitable speed limit is identified on which a plurality of vehicles are driving at a vehicle speed falling short of the speed limit stored in a digital map by a predetermined value. Using the statistical evaluation, it can be determined comparatively safely that the predetermined speed limit is suitable or unsuitable, whereby a possible risk potential of this route portion can be recognized.

In particular, a causal connection between the road, of which the width falls short of the predetermined value, and a reduction of the driving speeds of a plurality of the vehicles is determined by means of the computer unit, whereby it can be determined whether the predetermined speed limit is suitable, and whether a potential critical situation on the route portion is rare, and there is no connection with the predetermined speed limit.

In a further possible embodiment of the method for checking a predetermined speed limit, the suitable driving speed is predetermined based on a statistical average value formed from the respective driving speed of a plurality of the vehicles recorded on the route portion.

By forming the average value in relation to the driving speed suitable for the route portion, the probability that a critical situation occurs on the route portion, in particular when vehicles swerve to avoid each other, is comparatively low. If the vehicles are driving on the route portion at the suitable driving speed, the safety on the route portion can thus be significantly increased.

If, in a possible development of the method for checking a predetermined speed limit, it is determined that the speed limit stored in the digital map is unsuitable, and thus that there is a comparatively high risk potential for approaching vehicles, the digital map, in particular the stored speed limit, is thus replaced by the suitable driving speed. By correcting the digital map, for example of a navigation system, the unsuitable driving speed for this route portion is not transmitted at all, because the latter is no longer stored.

The invention further relates to a method for supporting a driver of a vehicle, wherein a suitable driving speed determined according to the method for checking a predetermined speed limit for vehicles on a road is transmitted, in particular displayed, as a speed recommendation to the driver of the vehicle when driving on the road, and/or is used as the basis for controlling an assistance system of the vehicle.

The driving speed suitable for driving on the route portion is displayed to a driver of the respective vehicle by means of the speed recommendation, which in particular serves as orientation assistance for the driver. The driver thus has the option of driving on the route portion with the suitable driving speed, such that their safety, but also the safety in particular for an approaching vehicle, is increased.

As an alternative or in addition, the determined suitable driving speed is used as the basis for controlling an assistance system, such that the suitable driving speed is binding for the assistance system, and the vehicle drives on the route portion with the suitable driving speed.

In particular, the suitable driving speed is used as a basis of a speed recommendation in an assistance system for the automated driving operation or in an assistance system for speed-dependent spacing regulation of the respective vehicle when driving on the road. If the vehicle is driving on the route portion in the automated driving operation or with activated speed-dependent spacing regulation, the suitable driving speed is predetermined as a set speed, i.e., as an intended speed. For example, when a speed-dependent spacing regulation is activated, a driving speed set by the driver is ignored due to the speed recommendation, unless the set driving speed corresponds to the suitable driving speed or falls short of the latter.

Exemplary embodiments of the invention are explained in more detail in the following with reference to drawings.

BRIEF DESCRIPTION OF THE DRAWING FIGURES

Figure 2:
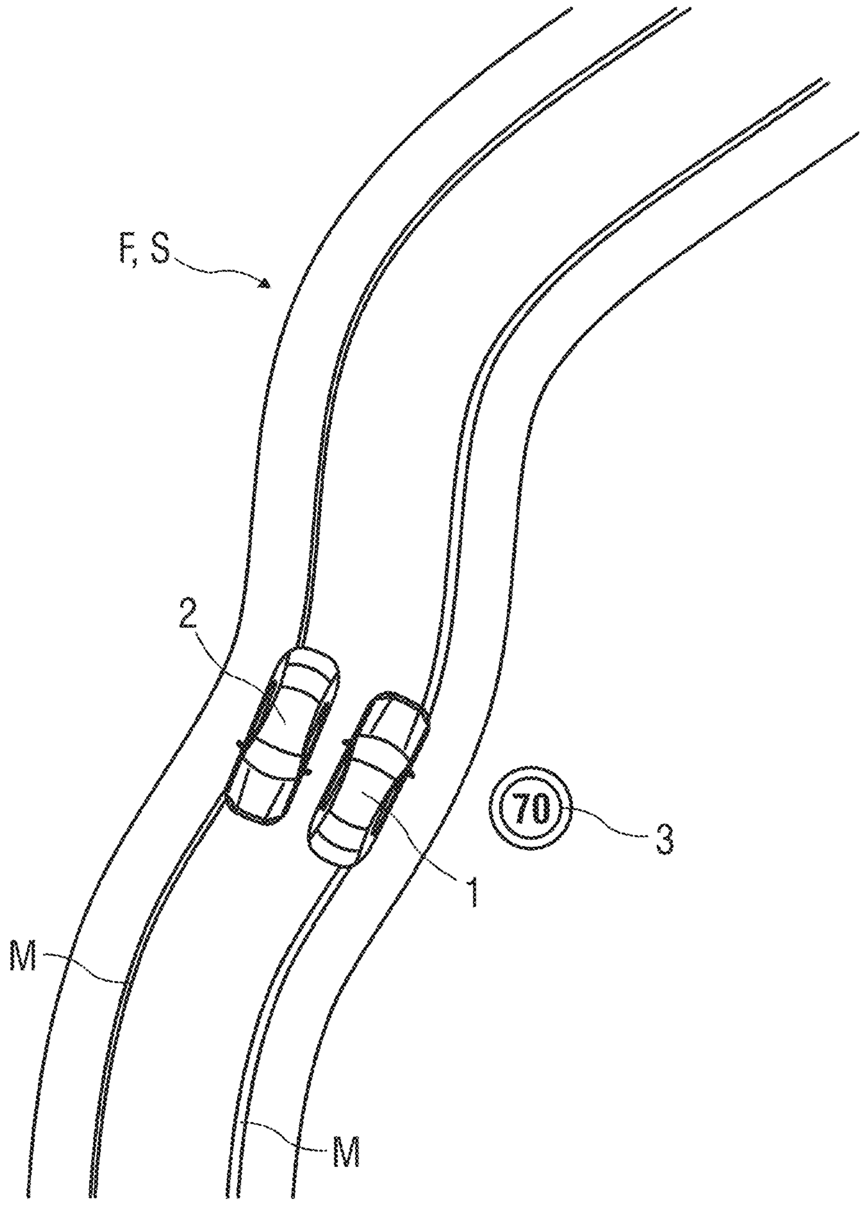

Here:

FIG. 1 schematically shows a route portion of a road with two approaching vehicles, which are driving with a driving speed which is unsuitable for this route portion, said driving speed corresponding to a predetermined speed limit, and FIG. 2 schematically shows the route portion of the road with two vehicles driving past each other after a predetermined speed limit is corrected.

Parts corresponding to one another are provided with the same reference numerals in all figures.

DETAILED DESCRIPTION

FIG. 1 shows a route portion S of a road F, which is only laterally delimited by means of lane markings M, and lacks a central lane marking M. Two vehicles 1, 2, which are approaching each other, are driving on the route portion S, wherein the vehicles 1, 2 are driving on the route portion S with a driving speed substantially corresponding to a speed limit of 70 km/h predetermined by means of a traffic sign 3.

The route portion S, i.e., the road F, has a width b falling short of a predetermined value, such that the route portion S is formed as an unusually narrow road F for two-directional traffic, and thus traffic driving in opposite directions. According to the exemplary embodiment shown in FIG. 1, a region B of the road F is depicted with a dashed line. In this region B, the vehicles 1, 2 driving on the road F usually reduce their driving speed.

It is generally known that there are numerous influences, as a result of which particular route portions S are driven on at a lower speed than a bend permits and/or a predetermined speed limit allows.

In the following, a method is described, by means of which a predetermined speed limit for vehicles 1, 2 on the road F is checked.

Such a road F shown in FIGS. 1 and 2 can, in particular, be found as a country road, where due to the narrow width b of the road F, no central lane marking M for separating opposite lanes is present.

Approaching vehicles 1, 2 drive over a respective outer road marking M, and thus partially leave the road F so that they can drive past each other. The vehicles 1, 2 reduce their current driving speed significantly in relation to the predetermined speed limit, for example of 70 km/h.

In the case of drivers of vehicles 1, 2 who are unfamiliar with the area and/or are comparatively young, who are largely guided by the predetermined speed limit depicted on the traffic sign 3, the danger arises of them underestimating a braking distance if two vehicles 1, 2 approach each other on such a road F and have to brake to be able to drive past each other.

By contrast, drivers who are familiar with the area usually select a speed course adjusted to the width b of the road F when driving on the road F, which takes into account critical road portions S with vehicles 1, 2 approaching each other.

In particular, the method provides that the predetermined speed limit is checked such that it is possible to profit from experiences of the drivers familiar with the area, wherein an observed and learned driving behavior in relation to the route portion S is offered to the vehicles 1, 2, which, for example, belong to a vehicle fleet, as an instruction or speed recommendation.

Using a driving behavior in relation to a driving speed of a plurality of vehicles 1, 2 on a comparatively narrow road F, the width of which in particular falls short of a predetermined width b, a criticality is derived.

For this purpose, the width b of the road F is determined using recorded signals of sensors of an environment sensor system of a vehicle 1, which width substantially falls short of a width b for traffic in two directions.

In addition, the driving speeds of the vehicles 1, 2 driving past each other and positions of the vehicles 1, 2 driving past each other are determined, in particular in relation to the road markings M.

For evaluation, the determined width b of the road F, the determined vehicle speeds, and the recorded positions of the vehicles 1, 2 driving past each other are transmitted as information to a vehicle-external computer unit (not depicted in more detail) coupled with the vehicle 1 via data technology.

Events, such as, in particular, driving over the road markings M, wherein the respective vehicle 1, 2 at least partially leaves the road F, are an indication that particular care is required on the route portion F, and the predetermined speed limit, for example of 70 km/h, is unsuitable for this route portion S in both directions of travel.

In order to obtain a statistically meaningful sample, vehicles 1, 2 driving on the route portion S are observed by a plurality of vehicles 1, 2, which are, in particular, associated one and the same vehicle fleet.

In particular, the determined width b of the road F is also transmitted as information to the computer unit to check a causal connection between the respective reduction of the driving speed of the vehicles 1, 2 and the relatively unusually narrow road F. In the computer unit, a so-called back-end, the causal connection between the narrow road F, the vehicles 1, 2 that are leaving the road F to be able to drive past each other, and the reduction of the current driving speed connected to the latter is determined statistically on the basis of a relatively large sample on each route portion S.

In particular by means of the computer unit, a statistical evaluation of the information transferred from a plurality of vehicles 1, 2 to the computer unit is carried out, and the route portion S with an unsuitable speed limit is identified on which a plurality of vehicles 1, 2 are driving at a vehicle speed which falls short of the predetermined speed limit by a predetermined value, which speed limit is also stored in a digital map of the vehicles 1, 2.

In order to produce the causal connection, an observation of the predetermined speed limit and, for example, of a reasonable bend speed on the basis of a bend curve is required. In particular, it is determined that, on statistical average, the drivers drive significantly slower on the route portion S than is required for a route course, e.g., a bend course, and in relation to the predetermined speed limit.

In particular, a suitable driving speed for driving on the route portion S is determined by forming a statistical average value of the respective driving speed of the plurality of vehicles 1, 2 recorded on the route portion.

If, due to the size of the sample and a significant reduction of the driving speed of a plurality of vehicles 1, 2, it was possible to legitimize that the predetermined speed limit is unsuitable, then the determined suitable driving speed for driving on the route portion is stored in the digital map as a speed recommendation. The predetermined speed limit stored in the digital map is corrected via the determined suitable driving speed.

In order to support the driver of a respective vehicle 1, 2, this speed recommendation, which is based on the suitable driving speed, is then displayed in the vehicle 1, 2 as a speed recommendation when driving on the road F, and/or a control of an assistance system of the vehicle 1, 2 is for example used as the basis of the automated driving operation or speed-dependent spacing regulation.

Via the determined suitable driving speed for driving on the route portion S, the driver of the respective vehicle 1, 2 experiences a speed selection appropriate for the situation, in particular in the case of comparatively unusually narrow roads F, and can thus increase their trust in the respective assistance system.

In the event of a speed regulation of the vehicle 1, 2 due to the speed recommendation, the driver of the respective vehicle 1, 2 can thus drive even in areas which are unfamiliar to them with a style of driving which reduces a potential for critical situations in the event of an encounter with an approaching vehicle 1, 2 which is too fast and a swerve over a road marking M.

Although the invention has been illustrated and described in detail by way of preferred embodiments, the invention is not limited by the examples disclosed, and other variations can be derived from these by the person skilled in the art without leaving the scope of the invention. It is therefore clear that there is a plurality of possible variations. It is also clear that embodiments stated by way of example are only really examples that are not to be seen as limiting the scope, application possibilities or configuration of the invention in any way. In fact, the preceding description and the description of the figures enable the person skilled in the art to implement the exemplary embodiments in concrete manner, wherein, with the knowledge of the disclosed inventive concept, the person skilled in the art is able to undertake various changes, for example, with regard to the functioning or arrangement of individual elements stated in an exemplary embodiment without leaving the scope of the invention, which is defined by the claims and their legal equivalents, such as further explanations in the description.

The invention claimed is:

1. A method for checking a predetermined speed limit for vehicles on a road, the method comprising:

determining, by a plurality of vehicles, situation-dependent data for a route portion of the road, wherein situation-dependent data includes a road width, driving speeds of vehicles driving past each other and positions of the vehicles driving past on a route portion of the road;

transmitting, by the plurality of vehicles to a vehicle-external computer, the situation-dependent data;

determining, by the vehicle-external computer by statistically analyzing the situation-dependent data, a situation-dependent suitable driving speed for driving on a route portion of the road;

determining, by the vehicle-external computer, that the predetermined speed limit is unsuitable responsive to the situation-dependent suitable driving speed falls short of the predetermined speed limit, wherein the predetermined speed limit is evaluated as unsuitable responsive to the route portion of the road having traffic travelling in an opposite direction and a width of the road is below a predetermined value;

storing, by the vehicle-external computer, the situation-dependent suitable driving speed in a digital map;

transmitting, by the vehicle-external computer to an autonomous vehicle, the digital map; and autonomously operating, based on the digital map, the autonomous vehicle on the route portion of the road to limit a speed of the autonomous vehicle to at or below the situation-dependent driving suitable driving speed.

2. The method of claim 1, wherein a causal connection between the road, of which the width is less than the predetermined value, and a reduction of the driving speeds of the plurality of vehicles is determined by the vehicle-external computer.

3. The method of claim 1, wherein the situation-dependent suitable driving speed is predetermined based on a statistical average value formed from the respective driving speed of the plurality of the vehicles recorded on the route portion.

4. The method of claim 1, wherein the predetermined speed limit stored in the digital map is replaced by the situation-dependent suitable driving speed responsive to the determination that that the predetermined speed limit is unsuitable.

* * * * *